United States Patent [19]

Grinberg

[11] Patent Number: 5,308,279
[45] Date of Patent: May 3, 1994

[54] AIR CIRCULATORY SYSTEM FOR AN ENCLOSURE

[75] Inventor: Eugene Grinberg, Peoria, Ill.

[73] Assignee: Caterpillar Inc., Peoria, Ill.

[21] Appl. No.: 773,629

[22] PCT Filed: Oct. 28, 1991

[86] PCT No.: PCT/US91/07953
§ 371 Date: Oct. 28, 1991
§ 102(e) Date: Oct. 28, 1991

[87] PCT Pub. No.: WO93/08997
PCT Pub. Date: May 13, 1993

[51] Int. Cl.⁵ .............................................. B60H 1/26
[52] U.S. Cl. ................................... 454/139; 454/144; 454/151; 454/158
[58] Field of Search ................. 454/85, 93, 99, 121, 454/127, 139, 144, 151, 152, 156, 158

[56] References Cited

U.S. PATENT DOCUMENTS

| 2,970,456 | 2/1961 | Rice | 454/151 X |
|---|---|---|---|
| 4,088,364 | 5/1978 | Termont | 454/136 X |
| 4,344,356 | 8/1982 | Casterton et al. | 454/158 X |
| 4,467,706 | 7/1984 | Batcheller et al. | |
| 4,503,749 | 3/1985 | Kuhn et al. | |
| 4,612,975 | 9/1986 | Ikari | |
| 4,874,036 | 10/1989 | Masuda | |
| 4,989,500 | 2/1991 | Anliker et al. | 454/158 |
| 5,119,718 | 6/1992 | Wagner et al. | 454/158 |
| 5,131,886 | 7/1992 | Haustein | 454/93 |

FOREIGN PATENT DOCUMENTS 1075524 4/1980 Canada .................... 454/144

Primary Examiner—Harold Joyce
Attorney, Agent, or Firm—William C. Perry

[57] ABSTRACT

The air circulatory system (32) utilizes a first and second air passageways (46) for communicating ambient air into the cab and an inlet (73) to introduce air that is circulating within the cab into the system through passageways (48,50,70,34) that create very little restriction for the air flowing therethrough. A pair of ducts (76) is utilized to discharge to air back into the cab (10) that also creates very little restriction for the air flow. This results in a very small drop in air pressure between the air being introduced into the blower assembly (40) and the air exiting the blower assembly (40). Subsequently, the requirements of the blower assembly (40) and the noise created by its operation kept at a minimum.

18 Claims, 4 Drawing Sheets

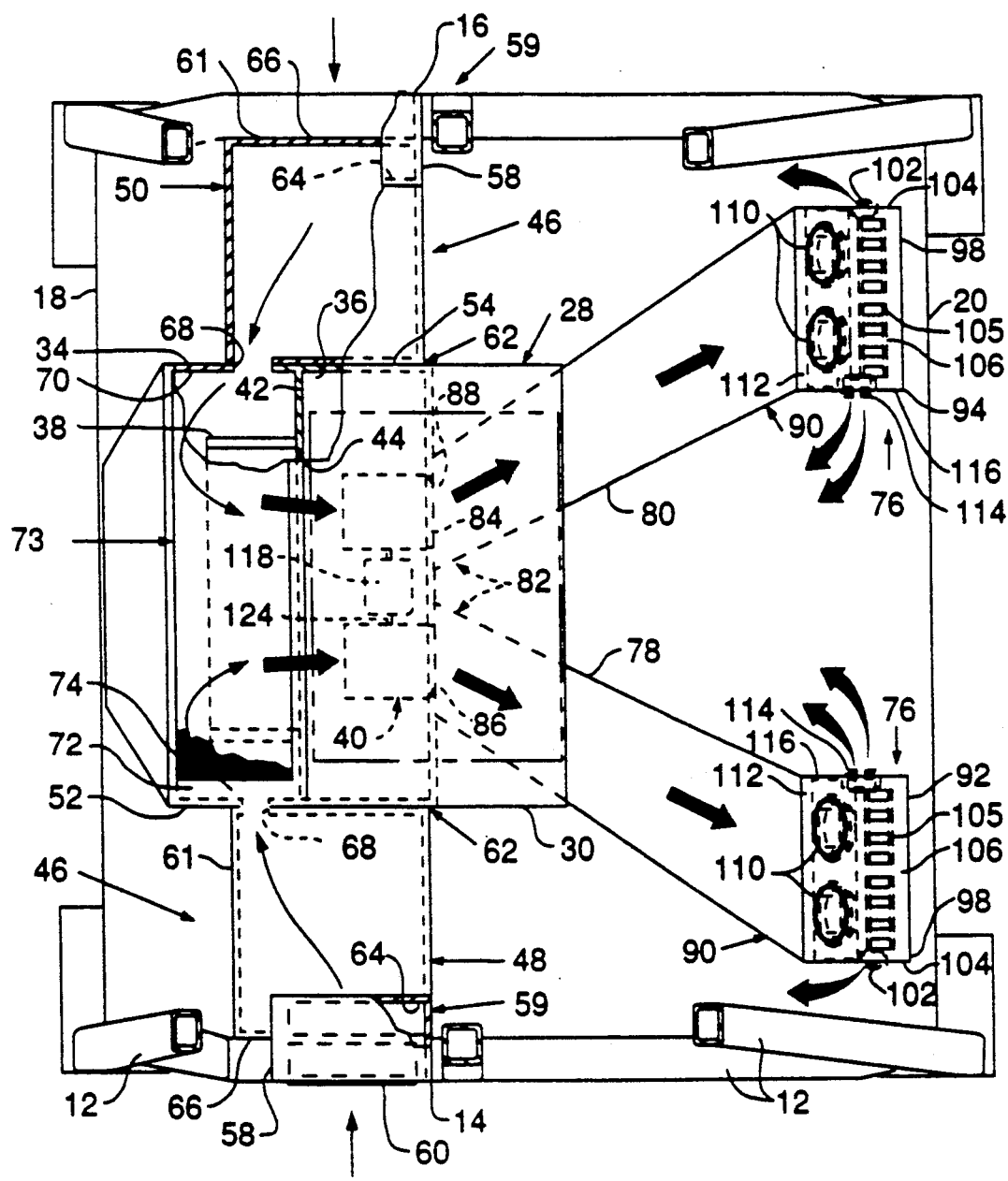

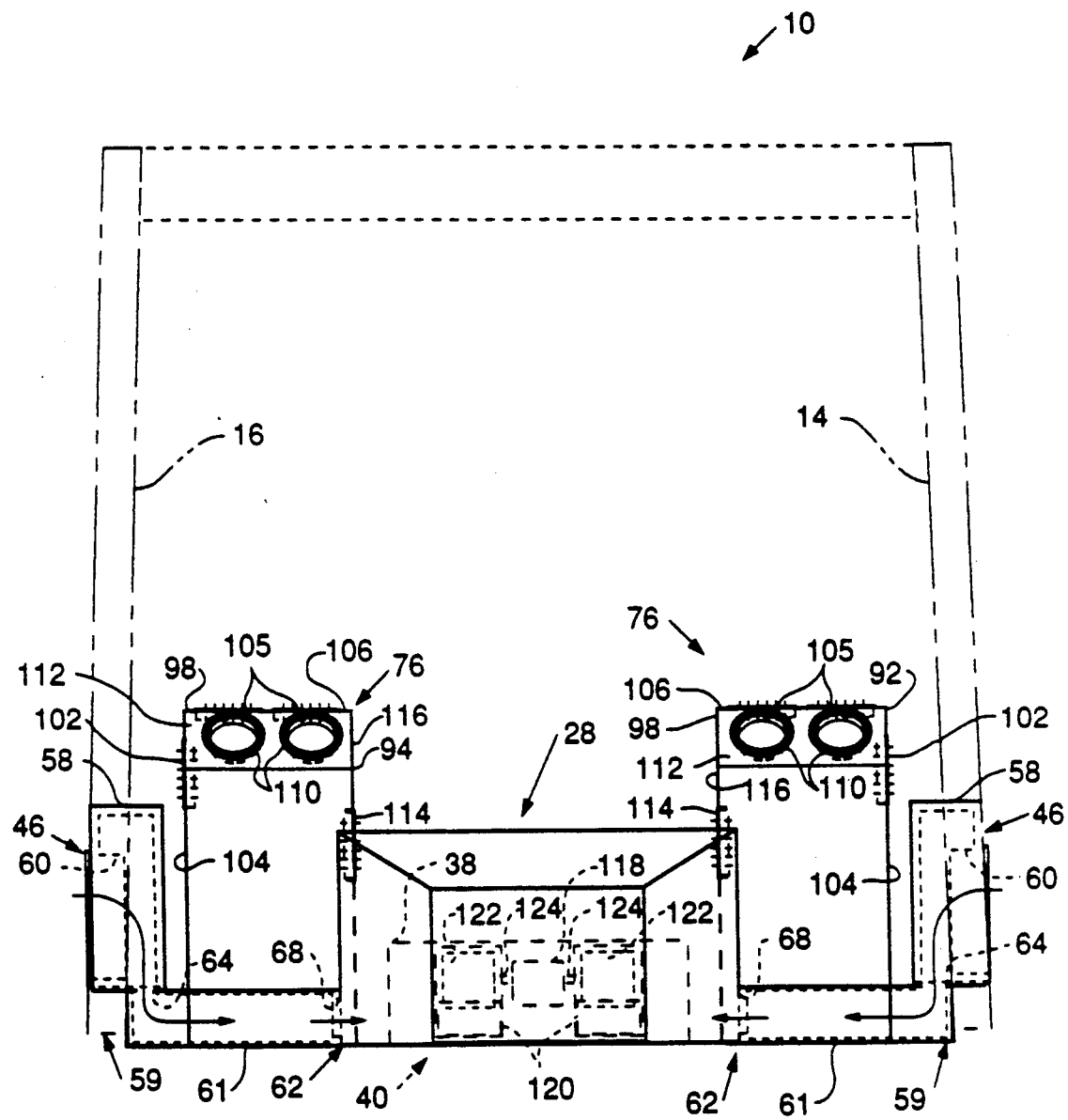

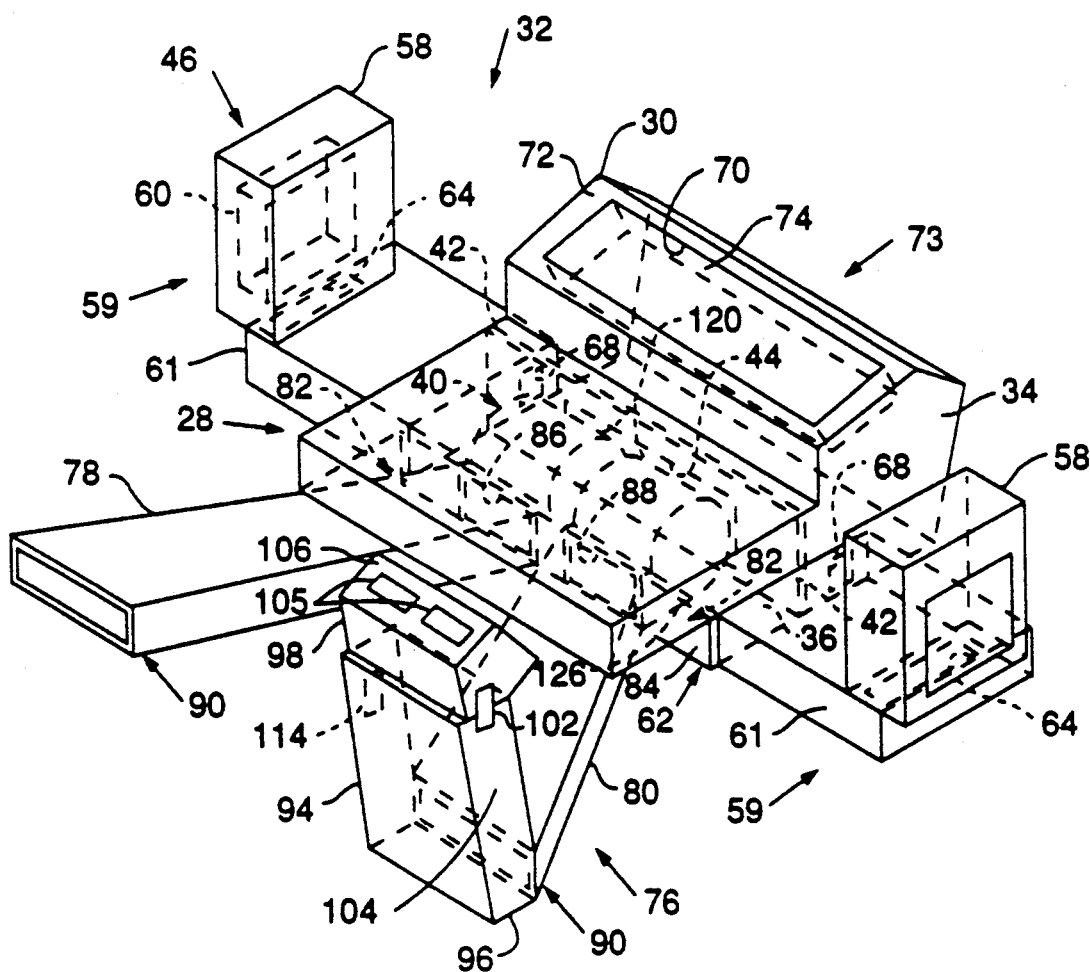

AIR CIRCULATORY SYSTEM FOR AN ENCLOSURE

DESCRIPTION

1. Technical Field

This invention relates to an air circulatory system and more particularly to a system for environmentally conditioning the air circulating within a cab of a vehicle.

2. Background Art

In the operation of present day construction vehicles, the noise within the cab to which the operator is subjected is of ever increasing concern. One of the major contributors to the noise created within the cab is the heating, ventilating and air conditioning system which is commonly referred to as the HVAC. Noise within these systems can be created by numerous factors which include the number motors utilized to operate the blower fans and the speed at which the blower fans must operate to obtain a sufficient flow of air within the cab. These criteria are often times a result of the amount of restriction created by the duct work through which the air must flow and the resultant pressure drop which is created between the inlet and discharge sides of the blower assembly. As the restriction within the system increases, the pressure drop that exists between the inlet and outlet sides of the blower also increases. The greater the pressure drop, the higher the fan speed must be to create a sufficient flow of air to effectively ventilate the cab. Alternatively, multiple blowers may be utilized to increase the flow of air; however, both solutions have an adverse effect on the amount of noise created by the heating and air conditioning system.

Many times the amount of restriction created within the system is a function of available space in which the various components and duct work may be placed. For instance, it is always desirable to mix fresh air from outside the cab with air that is being recirculated within the cab. In many instances there is not enough room to locate duct work that is specifically dedicated to communicate fresh air into the system. As a result, it is very common to utilize the tubular framework that already exists in the structure of the cab as a duct to communicate the fresh air into the system. While this is a very efficient use of space and available componentry, it creates a relatively tortuous path through which the fresh air must traverse, thus increasing the amount of restriction within the system. An example of this type of design is disclosed in U.S. Pat. No. 4,365,541, issued to Marques et al. on Dec. 28, 1982.

Another source of restriction that is disclosed in the Marques et al. patent resides in the positioning of the filters for both the fresh air and the recirculated air. Again, since space is a very precious commodity, the filters for both sources of air have been positioned in the same area to facilitate serviceability. The filters are positioned in-line with each other in a generally common housing. The fresh air filter is positioned upstream of the recirculation filter leaving a relatively small space between the filters. The space serves as an inlet through which the recirculated air may be introduced into the flow of air that is drawn through the heating and air conditioning unit by the operation of the blowers. Because the inlet is so small, it is apparent that a rather large restriction is created. As a result, multiple blowers or a single blower with a very high fan speed is necessary to provide the system with sufficient air flow. This situation will ultimately result in an increase in the operational noise of the system.

The present invention is directed to overcoming one or more of the problems as set forth above.

DISCLOSURE OF THE INVENTION

In one aspect of the present invention an air circulatory system is provided for conditioning the environment of an enclosure. The system includes a housing that is positioned within the enclosure and has first and second portions. A means is provided for communicating ambient air from outside the enclosure into the first portion of the housing. A means is also provided for communicating air that circulates within the enclosure with the first portion of the housing to be mixed with the ambient air. A means for discharging air from the housing is included that defines a plurality of discharge ports that are spaced from the housing. A blower assembly that has a single motor and a pair of fan members that are rotatably connected on opposite sides of the motor is included in the system. The blower assembly is positioned in the second portion of the housing and is sufficient for drawing an environmentally acceptable amount of the mixture of air from the first portion of the housing into an inlet portion thereof and directing it to the discharge ports through an outlet portion. The air pressure in the outlet portion of the blower is predetermined to be within a range of 0.398 to 0.439 KpA greater than the pressure in the inlet portion of the blower assembly.

In another aspect of the invention, an air circulatory system is adapted for use with a cab of a vehicle. It includes a housing that has a first and second compartment and an opening defined in the housing for communication of air that is circulated within the cab into the first compartment. A pair of fresh air passageways are provided that have a first end portion that define an opening in a respective one of a pair of opposing sides of the cab. A second end portion of the air passageways is engaged with a respective one of a pair of opposing sides of the first compartment. The fresh air passageways are sufficient for communicating ambient air outside the cab with the first compartment of the housing. An air duct assembly is included in the system that has a first end portion positioned for communication with the second compartment of the housing and a second end portion has at least one air discharge port defined thereon. A blower assembly is provided that has an inlet portion and an outlet portion and is sufficient for drawing ambient air and the air circulating within the cab into the first compartment and directing it back into the cab through the discharge ports. The pressure drop in the blower assembly, between the inlet and outlet portions, is within a range of 0.398 to 0.439 KpA.

In yet another aspect of the present invention, an air circulatory system is included in the cab of a vehicle that has a seat mounted to a base of the cab in a manner to provide a location from which an operator may control the vehicle. The system includes a housing that has an air intake portion and an air discharge portion and is mounted to the base in a manner to form a mounting platform for the seat. An air intake port is defined by the housing at a location that is behind the seat and is sufficient for communicating air circulating within the cab into the air intake portion of the housing. A filter assembly is mounted to the housing in overlying relation to the air intake port. A means for discharging air from the discharge portion of the housing is provided and is positioned to communicate a flow of air from a pair of laterally spaced openings defined in discharge portion of the housing to a plurality of discharge ports that are positioned forwardly of the seat and are spaced laterally from one another a distance at least substantially equal to the width of the seat. A blower assembly is included in the system that has a single motor and a pair of fan members positioned on opposite sides of the motor. The blower assembly is positioned within the discharge portion of the housing such that the fan members are aligned with the respective openings defined in the discharge portion of the housing. The blower is sufficient for drawing air through the filter assembly and inlet portion of the housing, into the discharge portion of the housing and then directing the air under pressure through the discharge means to the discharge ports in a manner wherein the air is circulated between the discharge ports and the filter in a generally circular pattern around the operator as he is positioned in the seat.

The present invention provides an air circulatory system that allows air to be drawn into the blower housing from the outside of the cab as well as from within the cab with a minimum of restriction created within the system's duct work. Likewise, the duct work that directs the air from the blower housing to the vents that introduce the conditioned air back into the cab are also relatively free of restriction. The reduced restriction to airflow will in turn, provide a greatly reduced differential in air pressure from one side of the blower to the other. Therefore, it can be seen that an air circulatory system having this combination of factors permits the use of a blower that requires only a single motor and a pair of fans to provide a sufficient amount of air flow within the cab to maintain a satisfactory work environment under all conditions. Since the number of blowers utilized and speed of the fans is kept to a minimum, the noise created by the operation of the system is greatly reduced.

BRIEF DESCRIPTION OF THE DRAWINGS

FIG. 2 is a diagrammatic top view taken along lines 2—2 as indicated in FIG. 1;

FIG. 3 is a diagrammatic rear view of the air circulatory system along lines 3—3 as indicated in FIG. 1 with the structure of the cab being shown in phantom lines for reference purposes;

FIG. 4 is a diagrammatic isometric view of only the air circulatory system, as viewed from a position that is forward of and to the left of the operator illustrated in FIG. 1.

BEST MODE FOR CARRYING OUT THE INVENTION

Figure 1:
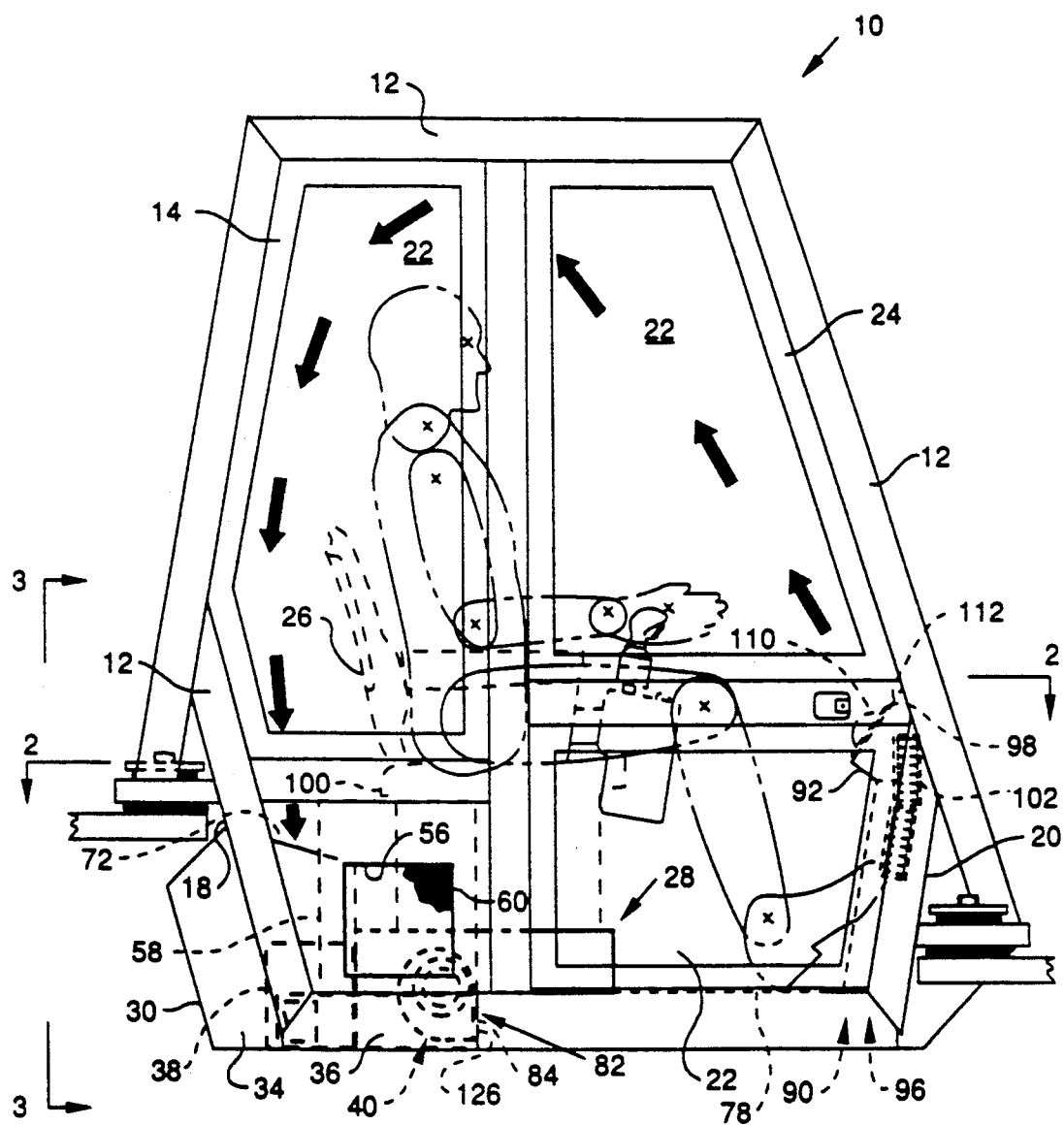
FIG. 1 is a diagrammatic side view of a vehicle cab that has an air circulatory system that embodies the principles of the present invention.

Referring now to the drawings, a cab 10 is shown that provides an enclosure from which a construction vehicle (not shown) may be operated. The cab 10 is formed by a plurality of tubular frame members 12 that are fastened together by welding or the like to form a skeletal structure of the enclosure. The skeletal structure defines a means of support for first and second sidewalls 14 and 16, that are positioned on the right and left sides of the enclosure respectively, and a front and rear wall 18 and 20. The walls of the enclosure are generally comprised of sheet metal frames that mount a plurality of windows 22 (FIG. 1) to provide the operator with good visibility. A doorway 24 is positioned in at least one side wall of the cab 10 to allow the operator convenient entrance and egress from the cab.

An operator (shown in phantom lines in FIG. 1) is positioned in a seat 26 that is generally centrally located within the cab 10. The seat is supported by a base member 28 that extends horizontally between the lowermost tubular frame members 12. A housing 30 is formed by the base member 28 that forms a platform to which the seat 26 may be secured.

The housing 30, in addition to providing a platform to which to seat 26 is mounted, also forms a portion of an air circulatory system 32 (FIG. 4) that provides environmental conditioning for the air within the cab 10. The housing 30 is separated into two portions 34 and 36. The first portion 34 forms an air intake compartment that houses an air conditioning unit 38 which serves to control the environment of the cab. In this particular application, the term "air conditioning" is utilized in its broadest sense and is meant to be applied to any treatment of the air such as heating, cooling, dehumidifying, etc. The second portion 36 of the housing 30 forms a discharge compartment in which a blower assembly 40 is located in a manner to be described hereinafter. The two compartments 34 and 36 are separated by a common wall 42 which has an opening 44 formed therein through which air is allowed to pass after it has been drawn through the air conditioning unit 38.

A means for communicating ambient air from outside the confines of the cab with the intake portion of the housing is shown generally at 46. The ambient air communicating means 46 includes first and second air passageways 48 and 50 that extend between the opposing sidewalls 14 and 16 respectively, of the cab 10 and a pair of opposing sides 52 and 54 of the housing 30. The first air passageway 48 extends between the right sidewall 14 and a wall 52 formed by the housing 30. The second air passageway 52 extends from the left sidewall 16 to a wall 54 formed on an opposite side of the housing 30. Since each of the first and second air passageways 48 and 50 is identical, the same reference numerals will be applied to identical components where possible. As indicated by the thinner air flow arrows, ambient air is introduced into each air passageway 48 and 50 through an opening 56 (FIG. 1) in the sidewall 14 and 16 of the cab and enters a first plenum member 58 which is defined on a first end portion 59 of the respective air passageways 48 and 50. The first plenum member 58 is mounted to the sidewall in a generally vertical orientation. A filter member 60 is positioned in covering relation to the opening 56 in the cab sidewall to clean impurities from the air that passes into the first plenum member 58. A second plenum member 61 is positioned beneath the first plenum 58 and is generally horizontally oriented to extend inwardly to join the housing 30 at a second end portion 62 defined by the air passageways 48 and 50. A first opening 64 is positioned between the first and second plenums 58 and 60 along an outer edge of 66 the second plenum and extends along a substantial width thereof as viewed in FIGS. 2 and 4. A second opening 68 is formed in the walls 52 and 54 that joins the second plenum 61 and the housing 30. The second opening 68 is positioned to the rear of the second plenum 61 so as not to be laterally aligned with the opening 64 between the first and second plenums. Each of the first and second plenums are lined with a suitable sound suppressing material (not shown) to absorb a substantial portion of the noise that may enter the air passageway via the opening 56 in the outer sidewall of the cab.

An inlet 70 is formed in an upper wall 72 of the first housing portion 34 and serves as a means 73 by which air that is circulating within the cab 10 is introduced into the first housing portion 34. The recirculated air, which is indicated by the thicker air flow arrows, is then allowed to mix with the fresh air before it is drawn into the air conditioning unit 38. A filter 74 is positioned in overlying relation to the recirculated air inlet 70 to remove any particulate matter from the air as it enters the first housing portion 34. The filter 74 is designed to be very large with respect to filters normally used in this application. In the present instance the area of the filter 74 is approximately 1481 square centimeters. The consistency of the filtering media is that of high density glass micro-fibers.

A means for discharging the air from the second portion 36 of the housing 30 back into the cab 10 is shown generally at 76. The discharge means 76 is attached to the housing 30 and extends forwardly therefrom. The discharge means 76 includes a pair of laterally spaced, horizontally oriented ducts 78 and 80 that have a first end 82 connected to a forwardly facing wall 84 of the housing. A pair of openings 86 and 88 are formed in the wall 84 and are spaced laterally from one another a distance coincident with the spacing between the discharge ducts 78 and 80 to communicate air between the housing 30 and the ducts. The ducts 78 and 80 each have a second end portion 90 that is larger in a lateral direction than the respective first end portions 82 to create a taper from the first to the second end portions 82 and 90 respectively. A second pair of ducts 92 and 94 has a first end portion 96 that is connected to the second end portions 90 of the respective first pair of ducts 78 and 80. The second pair of ducts 92 and 94 extend from the first pair of ducts 78 and 80 in a generally vertical direction. The second pair of ducts 92 and 94 terminate at a second end portion 98 that is substantially even in elevation with the lower portion 100 of the seat 26 (FIG. 1). A plurality of discharge ports or vents are mounted at various positions about the second end portion of each duct. Each vent is individually adjustable to direct a flow of air in a plurality of desired directions. A first vent 102 is located on an outboard side 104 of each of the second pair of ducts 92 and 94 and is directed toward the windows 22 defined by the sidewalls 14 and 16 of the cab 10. A pair of second vents 105 are positioned on an upper surface 106 of each of the second pair of ducts 92 and 94 and may be adjusted to direct air flow to the windshield (not shown) of the cab. A pair of third vents 110 are positioned on an angled surface 112 that extends downwardly from the upper surface 106 to face the operator and provide a flow of air in that direction. A fourth vent 114 is positioned on an inner wall 116 of each the second pair of ducts 92 and 94 to direct a flow of air inwardly and downwardly toward the operator's feet when he is positioned in the seat 26.

The blower assembly 40, as previously set forth, is mounted within the discharge portion 36 of the housing 30. The blower assembly 40 is powered by a single motor 118 that is positioned between a pair of fan housings 120. As can be seen in FIGS. 2 and 3, a fan member 122 is positioned within each fan housing 120 and is mounted for rotation on a common shaft 124 that extends into the fan housings 120 from each end of the motor 118. The fan housings 120 are laterally spaced apart a distance that correspondents to the spacing of the openings 86 and 88 formed in the forward wall 84 of the housing 30. The fans 122 are positioned adjacent the openings 86 and 88 so that the air is moved directly from an outlet 126 of the fan housing 120 into the first pair of ducts 78 and 80.

INDUSTRIAL APPLICABILITY

In the operation of the air circulatory system 32 disclosed herein, ambient air and air circulating within the cab 10 are drawn into the first portion or intake chamber 34 of the housing 30 by the rotation of the fans 122 in the blower assembly 40. Ambient air from outside the cab 10 is drawn through the fresh air filters 60 on each side 14 and 16 of the cab into the first plenum members 58. The air is then drawn from the first plenum member 58 into the second plenum member 61 through the opening 64 formed therebetween. Since the opening 64 is relatively large and extends nearly the entire width of the first plenum 58, the air is allowed to enter the second plenum 61 with very little restriction. The force from the blower assembly 40 draws the air diagonally across the second plenum 61 to the opening 68 formed between the second plenum 61 and the first housing portion 30. Again since the second plenum 61 is formed in the shape of a rectangle that is wide and flat, the air is allowed to move between the two openings 64 and 68 with very little restriction. It should be noted that the low restriction of air flow may in some instances be conducive to the transmission of noise into the system. However, as previously described, the first and second openings 64 and 68 in the second plenum 61 are laterally offset from one another. This positioning results in the entrapment of the noise within the second plenum since the noise entering the second plenum 61 will tend to move in a straight line across the plenum. As it does so, the majority of the noise will tend to be directed into the opposing wall of the second plenum 61 and not toward the opening 68 in the housing 30. Since the plenums are lined with sound suppression material, the noise is substantially attenuated in the second plenum and not transmitted into the housing.

Rotation of the blower fans 122 also draws air through the filter 74 and the inlet 70 formed in the upper wall 72 of the housing 30 into the inlet chamber 34. Because of the particular composition of the filter material and the large size of the filter 74 and the opening 70 through which the air must pass, the restriction of air flow from within the cab 10 is also kept to a minimum.

The air from within the first portion 34 of the housing 30 is drawn through the air conditioning unit 38 for selective treatment thereof and then into the second, or discharge portion 36 of the housing 30. The conditioned air is then drawn into the fan housings 120 and directed under increased pressure into the first pair of discharge ducts 78 and 80. Since the first pair of discharge ducts 78 and 80 are located immediately adjacent the respective fan housings 120, the air is introduced directly into the first pair of discharge ducts. Since the first pair of ducts 78 and 80 are tapered as they extend toward their second end portion 90, virtually no turbulence is created by the movement of air into the ducts. The air is then directed upwardly into the second pair of discharge ducts 92 and 94 whose connection with the first pair of ducts 78 and 80 forms a smooth transition therebetween. The air is selectively directed into the cab 10 by the discharge vents 102, 104, 110 and 114 that are all located in front of the operator. Since the majority of the vents are directed upwardly and rearwardly and the recirculation filter 74 is positioned directly behind the seat 26, the air flow within the cab is naturally directed in a circular pattern around the operator and back into the recirculation filter 74.

With an air circulatory system 32 as described above, a cab 10 of a vehicle is provided with an environmentally sufficient flow of selectively conditioned air that is very quiet in its operation. Fresh air and recirculated air are drawn into the system through air passageways that have very little restriction for the air that flows therethrough. At the same time, the air is discharged into the cab through passageways that also have very little flow restriction. Because of the reduced restriction to the flow of air, the pressure drop between the air that enters the discharge compartment 36 is within a range of 0.398 to 0.439 KpA of the air that is expelled into the first pair of discharge ducts 78 and 80. This ultimately reduces the requirements necessary for the blower assembly 40 to move the air throughout the system. Since the blower assembly utilizes only a single motor 118 and a pair of fans 122 that have a relatively low speed of rotation, its operation creates very little noise within the cab.

Other aspects, objects and advantages of this invention can be obtained from a study of the drawings, the disclosure and the appended claims.

I claim:

1. An air circulatory system (32) adapted for use with a cab (10) of a vehicle, comprising:
    a housing (30) having first and second compartments (34,36) and an inlet (70) defined by the housing (30) for communication with air circulating within the cab (10) into the first compartment (34) said housing providing support for a seat assembly;
    a pair of fresh air passageways (48,50) each having a first end portion (59) that defines an opening (56) in a respective one of an opposing side (14,16) of the cab (10) and a second end portion (62) that is engaged with a respective one of opposing sides (52,54) of the first compartment (34), said fresh air passages (48,50) being sufficient for communicating ambient air outside the cab (10) with the first compartment (34);
    an air duct means (78,80) having a first end portion (82) positioned for communication with the second compartment (36) of the housing (30) and a second end portion (90) that extends forwardly from the housing (30) to a position that is adjacent a front wall (18) of the cab (10) and defines a plurality of air discharge ports (102,104,110,114) that are spaced laterally from one another a distance that is substantially equal to the width of the seat assembly; and
    a blower assembly (40) positioned in the second compartment (36) and being sufficient for drawing ambient air and air circulating within the cab (10) through the first compartment (34) and into the second compartment (36) and directing it back into the cab (10) through the discharge ports (102,104,110,114) at a preselected pressure that is within a range of 0.398 to 0.439 KpA greater upon discharge from the second compartment (36) than the air that is drawn into the second compartment (36).

2. An air circulatory system (32) as set forth in claim 1 the pair of fresh air passageways each (48,50) further include:
    a first, generally vertically extending plenum (58) mounted to the respective sides (14,16) of the cab (10) about the openings (56) formed therein;
    a second, generally horizontally extending plenum (61) having a first and second opening (64,68) formed therein and being positioned subjacent the first plenum (58) along an outer portion (66) of the second plenum (61) and extending inwardly to the housing (30), said first opening (64) being sufficient for communication with the first plenum (58) and said second opening (68) being positioned for communication with the first compartment (34) of the housing (30).

3. An air circulatory system (32) as set forth in claim 2 wherein the second plenum member (61) forms a substantially square chamber having the first and second openings (64,68) positioned on substantially opposite ends thereof and being laterally offset from one another so that the ambient air drawn therethrough by the blower assembly (40) traverses in a generally diagonal path from the first opening (64) communicating with the first plenum (58) to the second opening (68) communicating with the first housing compartment (34).

4. The air circulatory system (32) as set forth in claim 1 wherein a wall (42) is positioned between the first and second housing compartments (32,34) and defines an opening (44) therein to permit a flow of air to pass therethrough and a air conditioning unit (38) is positioned in the first compartment (34) of the housing (30) adjacent the opening (44) to environmentally treat the air as it flows from the first to the second compartment (32,34) of the housing (30).

5. The air circulatory system (32) as set forth in claim 1 wherein a seat assembly (26) is mounted on the housing (30).

6. The air circulatory system (32) as set forth in claim 1 wherein the inlet (70) defined by the housing (30) is centrally positioned behind the seat (26).

7. The air circulatory system (32) as set forth in claim 1 wherein a filter assembly (74) is positioned in overlying relation to the inlet (70) defined in the housing (30), said filter assembly (74) having a filter media of high density glass micro-fibers and a filtering area of approximately 1481 square centimeters.

8. The air circulatory system (32) as set forth in claim 1 wherein a filter assembly (60) is positioned in overlying relation to each of the openings (56) in the sidewalls (14,16) of the cab (10) formed by the fresh air passageways (48,50), said filter assemblies (60) having a filter media of high density glass micro fibers and a filtering area of approximately 431 square centimeters.

9. The air circulatory system (32) as set forth in claim 1 wherein the air duct means (78,80) includes a pair of ducts (78,80) that extend forwardly from the first end portion (82) with a progressively increasing flow area to an enlarged second end portion (90).

10. The air circulatory system (32) as set forth in claim 9 wherein the air duct means (78,80) forms a laterally extending taper between the first and second end portions (82,90) thereof to provide a generally uniform, increase in the flow area.

11. The air circulatory system (32) as set forth in claim 9 wherein the air duct means (78,80) further includes a second pair of ducts (92,94) having a first end portion (96) engaged with the second end portions (90) of the first pair of ducts (78,80) and a second end portion (98) that defines the plurality of discharge ports (102,104,110,114).

12. The air circulatory system (32) as set forth in claim 1 wherein the discharge ports (102,104,110,114) are positioned at an elevation that is substantially equal to that of the seat (26) and are arranged to discharge air in a generally circular path from the discharge ports (102,104,110,114) to the centrally positioned inlet (70) behind the seat (26).

13. In a cab (10) of a vehicle having a base portion (28), and a seat (26) supported by the base portion (28) to provide a location for an operator from which the vehicle may be controlled, an air circulatory system (32), comprising:

a housing (30) having an air intake portion (34) and an air discharge portion (36) and being mounted to the base portion (28) in a manner to form a mounting platform for the seat (26);

an inlet (70) defined by the housing (30) and being sufficient for communicating air circulating within the cab (10) into the air intake portion (34) of the housing (30) and being positioned rearwardly of the seat (26);

a pair of fresh air passageways (48,50) having a first end portion (59) defining an opening (56) in each of a respective pair of opposing sidewalls (14,16) of the cab (10) and a second end portion (62) engaged with each of a respective opposing side (52,54) of the air intake portion (32) of the housing (30) to communicate ambient air from outside the cab (10) to mix with the air circulating within the cab (10), said fresh air passageways being positioned substantially in horizontal alignment with the housing (30);

a filter assembly (74) mounted to the housing (30) in overlying relation to the inlet (70);

means (76) for discharging air from the discharge portion (36) of the housing (30), said means (76) being positioned to communicate a flow of air from a pair of laterally spaced openings (86,88) defined in the discharge portion (36) of the housing (30) to a plurality of discharge ports (102,104,110,114) that are positioned forwardly of the seat (26) at a location that is adjacent a front wall of the cab and are spaced laterally from one another a distance at least substantially equal to the width of the seat (26); and a blower assembly (40) having a single motor (118) and a pair of fan members (122) positioned on opposite sides of the motor (118), said blower assembly (40) being mounted in the discharge portion (36) of the housing (30) with the fan members (122) aligned with the respective openings (86,88) defined in the discharge portion (36) of the housing (30), said blower assembly (40) being sufficient for drawing air through the filter assembly (74) and inlet (70) and into the discharge portion (36) of the housing (30) and directing air under pressure through the discharge means (76) to the discharge ports (102,104,110,112) in a manner wherein the air is circulated between the discharge ports (102,104,110,114) and the filter (74) in a generally circular pattern around the operator as he is positioned in the seat (26).

14. The air circulatory system (32) as set forth in claim 13 wherein the air discharging means (76) further includes:

a first pair of ducts (78,80) having a first end portion (82) connected to the discharge portion (36) of the housing (30) in surrounding relation to one of the respective openings (56) defined therein and a second end portion (90), said first pair of ducts (78,80) extending from the housing (30) in a generally horizontal direction; and a second pair of ducts (92,94) having a first end portion (96) connected to the respective second end portions (90) of the first pair of ducts (78,80) and a second end portion (98) that mounts the plurality of discharge ports (102,104,110,114), said second pair of ducts (92,94) extending upwardly from the first pair of ducts (78,80) in a manner to create a minimum restriction of the air flowing therethrough.

15. The air circulatory system (32) as set forth in claim 14 wherein the first pair of ducts (78,80) define a forwardly extending, progressively increasing taper to form a substantially unrestricted transition of flow area between the first and second pairs of ducts (78,80,92,94).

16. The air circulatory system (32) as set forth in claim 13 wherein the plurality of discharge ports (78,80,92,94) further include:

at least one discharge port (102) that directs air flow in an outer direction toward a window (22) positioned in each side (14,16) of the cab (10);

at least one discharge port (104) that directs air flow toward an inner portion of the cab (10);

at least one discharge port (110) that directs air flow in an upward direction toward a forwardly facing windshield (22) defined by the cab (10); and at least one discharge port (114) that directs air flow in a rearward and upward direction toward the operator positioned in the seat (26) and a rearwardly facing window (22) defined by the cab (10).

17. The air circulatory system (32) as set forth in claim 16 wherein the respective discharge ports (102,104,110,114) are sufficient for individually adjusting the direction of air that flows therefrom.

18. The air circulatory system (32) a set forth in claim 13 wherein the blower assembly (40) directs the air through the air discharge means (76) at a preselected pressure that is within a range of 0.398 to 0.439 KpA greater than the pressure of the air that is drawn into the discharge portion (36) of the housing (30).

* * * * *